United States Patent
Izumoto et al.

(10) Patent No.: US 12,525,655 B2
(45) Date of Patent: Jan. 13, 2026

(54) NONAQUEOUS ELECTROLYTE SECONDARY BATTERY AND BATTERY PACK

(71) Applicants: Prime Planet Energy & Solutions, Inc., Tokyo (JP); TOYOTA JIDOSHA KABUSHIKI KAISHA, Aichi-ken (JP); PRIMEARTH EV ENERGY CO., LTD., Shizuoka-ken (JP)

(72) Inventors: Takaaki Izumoto, Toyohashi (JP); Yusuke Takashi, Toyohashi (JP)

(73) Assignees: PRIME PLANET ENERGY & SOLUTIONS, INC., Tokyo (JP); TOYOTA JIDOSHA KABUSHIKI KAISHA, Aichi-ken (JP); TOYOTA BATTERY CO., LTD., Shizuoka-ken (JP)

(*) Notice: Subject to any disclaimer, the term of this patent is extended or adjusted under 35 U.S.C. 154(b) by 498 days.

(21) Appl. No.: 18/186,213

(22) Filed: Mar. 20, 2023

(65) Prior Publication Data

US 2023/0307716 A1    Sep. 28, 2023

(30) Foreign Application Priority Data

Mar. 22, 2022  (JP) ................. 2022-045871

(51) Int. Cl.
*H01M 10/0587*  (2010.01)
*H01M 4/04*  (2006.01)
(Continued)

(52) U.S. Cl.
CPC ....... *H01M 10/0587* (2013.01); *H01M 4/043* (2013.01); *H01M 4/13* (2013.01);
(Continued)

(58) Field of Classification Search
CPC ............ H01M 4/043; H01M 10/0585; H01M 10/0587
See application file for complete search history.

(56) References Cited

U.S. PATENT DOCUMENTS

| | | | |
|---|---|---|---|
| 12,308,394 B2 * | 5/2025 | Yamada | H01M 50/183 |
| 12,334,258 B2 * | 6/2025 | Noh | H01M 50/103 |

(Continued)

FOREIGN PATENT DOCUMENTS

| | | |
|---|---|---|
| JP | 2000-133300 A | 5/2000 |
| JP | 2012-182025 A | 9/2012 |

(Continued)

*Primary Examiner* — Amanda C. Walke
(74) *Attorney, Agent, or Firm* — HAUPTMAN HAM, LLP (57) ABSTRACT

The nonaqueous electrolyte secondary battery herein disclosed includes a nonaqueous electrolyte, a wound electrode assembly, and a battery case accommodating them. The wound electrode assembly includes a pair of flat surface parts and a pair of R parts. In a state where 4.5 kN restriction pressure is added from a thickness direction so as to restrict the wound electrode assembly, when a total of outermost circumferential lengths of the pair of R parts of the wound electrode assembly on a cross section orthogonal to the winding axis of the wound electrode assembly is treated as a (mm), an outermost circumferential length of the cross section is treated as b (mm), a width of the positive electrode active material layer is treated as c (mm), and a height of the wound electrode assembly of the cross section is treated as d (mm), both 0.282<a/b and c/d<1.91 are satisfied.

4 Claims, 5 Drawing Sheets

(51) Int. Cl.
  *H01M 4/13* (2010.01)
  *H01M 10/0585* (2010.01)
  *H01M 50/11* (2021.01)
  *H01M 50/289* (2021.01)

(52) U.S. Cl.
  CPC ....... *H01M 10/0585* (2013.01); *H01M 50/11* (2021.01); *H01M 50/289* (2021.01)

(56) References Cited

U.S. PATENT DOCUMENTS

| | | | | |
|---|---|---|---|---|
| 2016/0190654 A1* | 6/2016 | Nishimoto | .......... | H01M 50/538 |
| | | | | 429/162 |
| 2016/0197350 A1* | 7/2016 | Nishide | ................ | H01M 4/624 |
| | | | | 429/223 |
| 2017/0077509 A1* | 3/2017 | Ise | ...................... | H01M 10/056 |
| 2022/0069359 A1* | 3/2022 | Yamada | ............. | H01M 50/186 |
| 2023/0318116 A1* | 10/2023 | Fujinaga | ............. | H01M 50/367 |
| | | | | 429/72 |
| 2024/0178506 A1* | 5/2024 | Onizuka | ............. | H01M 50/291 |

FOREIGN PATENT DOCUMENTS

| | | | |
|---|---|---|---|
| JP | 2013093122 A | * | 5/2013 |
| JP | 2016-9532 A | | 1/2016 |
| JP | 2016-105415 A | | 6/2016 |
| JP | 2019-185991 A | | 10/2019 |
| JP | 2020-177858 A | | 10/2020 |
| JP | 2020-184436 A | | 11/2020 |

\* cited by examiner

NONAQUEOUS ELECTROLYTE SECONDARY BATTERY AND BATTERY PACK

CROSS REFERENCE TO RELATED APPLICATIONS

The present application claims priority on the basis of Japanese Patent Application No. 2022-045871 filed in Japan on Mar. 22, 2022, the entire contents of which are incorporated herein by reference.

BACKGROUND

The present disclosure relates to a nonaqueous electrolyte secondary battery and a battery pack.

A secondary battery, such as a lithium ion secondary battery, can induce a high energy density with light weight, and thus is preferably used as a high output power supply for drive of a vehicle, such as an electric vehicle (battery electric vehicle) and a hybrid vehicle (hybrid electric vehicle), whose demand is expected to be increased further in the future.

Due to implementing a high output of the secondary battery, a development of a technique for suppressing degradation (high-rate degradation) of a battery characteristic caused by a high-rate charge and discharge operation is expected. As for this kind of technique, for example, Japanese Patent Application Publication No. 2019-185991 discloses a secondary battery including an electrolyte swelling layer. In addition, Japanese Patent Application Publication No. 2020-177858 discloses a configuration of a wound electrode assembly in which a distance between electrode plates is within a predetermined range.

SUMMARY

Anyway, there is a room for improvement in the technique of Patent Document 1, from a perspective of cost and energy density, since many extra liquids are required for adding the electrolyte swelling layer and impregnating the electrolyte swelling layer with the electrolyte. In addition, the technique of Patent Document 2 might not obtain a sufficient effect under a use environment where a restriction load is continuously added on the electrode assembly. Thus, a further development of the technique is desired to suppress the high-rate degradation.

Then, the present technique has been made in view of the above-described circumstances, and the main object is to provide a nonaqueous electrolyte secondary battery in which the high-rate degradation is suppressed. In addition, another object is to provide a battery pack including the nonaqueous electrolyte secondary batteries described above.

The herein disclosed nonaqueous electrolyte secondary battery includes a nonaqueous electrolyte, a wound electrode assembly formed in a flat shape, and a battery case formed in a square shape. In the wound electrode assembly, a sheet-shaped positive electrode, a sheet-shaped negative electrode, and a separator are stacked one on another and the stacked resultant is wound in a longitudinal direction so as to configure the wound electrode assembly. The positive electrode includes a positive electrode active material layer formed in a strip-like shape along the longitudinal direction on a long positive current collector. The negative electrode includes a negative electrode active material layer formed in a strip-like shape along the longitudinal direction on a long negative current collector. The separator is disposed between the positive electrode and the negative electrode. The battery case is configured to accommodate the nonaqueous electrolyte and the wound electrode assembly. The wound electrode assembly includes a pair of flat surface parts and a pair of R parts. The pair of flat surface parts are formed to be opposed to each other while sandwiching a winding axis. Surfaces of the pair of R parts formed between the pair of flat surface parts are curved surfaces. Here, in a state where 4.5 kN restriction pressure is added to restrict from an opposed direction of the flat surface parts onto a whole of the flat surface parts of the wound electrode assembly, when a total of outermost circumferential lengths of the pair of R parts of the wound electrode assembly on a cross section orthogonal to the winding axis of the wound electrode assembly is treated as a (mm), an outermost circumferential length of the wound electrode assembly on the cross section is treated as b (mm), a length of the positive electrode active material layer in the width direction orthogonal to the longitudinal direction is treated as c (mm), and a height of the wound electrode assembly being a distance between apexes of the pair of R parts on the cross section is treated as d (mm), both of the following conditions are satisfied:

$$0.282 < a/b; \text{ and}$$

$$c/d < 1.91.$$

In the wound electrode assembly of the nonaqueous electrolyte secondary battery including the above described configuration, a rate of the R part being a portion that contributes in a liquid retaining function is high, and thus it is possible to improve the ununiformity of the salinity of the electrolyte in the wound electrode assembly. In addition, by making a value of the height of the wound electrode assembly with respect to the positive electrode coating width being equal to or more than a predetermined rate, it becomes difficult to cause the ununiformity of the salinity of the electrolyte in the width direction. Thus, it is possible to suppress the high-rate degradation of the nonaqueous electrolyte secondary battery.

In one preferable aspect of the herein disclosed nonaqueous electrolyte secondary battery, a condition: $1.66 \leq c/d \leq 1.72$ is further satisfied. Thus, it is possible to more suitably suppress the high-rate degradation.

In one aspect of the herein disclosed nonaqueous electrolyte secondary battery, the height d of the wound electrode assembly might be equal to or more than 50 mm and not more than 55 mm. In the wound electrode assembly having this kind of size, it is possible to more suitably suppress the high-rate degradation.

In addition, the present disclosure provides a battery pack including the herein disclosed nonaqueous electrolyte secondary batteries. The herein disclosed battery pack is a battery pack in which plural single-batteries are electrically and mutually connected to be arranged, and at least one of the single-batteries is the herein disclosed nonaqueous electrolyte secondary battery. Thus, it is possible to implement a battery pack in which the high-rate degradation is suppressed.

DETAILED DESCRIPTION

Below, a herein disclosed technique will be described in details. The matters other than matters particularly mentioned in this specification but required for practicing the present technique can be grasped as design matters of those skilled in the art based on the related art in the present field. A content of the herein disclosed technique can be executed based on the contents disclosed in the present specification, and the technical common sense in the present field.

Incidentally, each figure is schematically drawn, and the dimensional relation (such as length, width, or thickness) might not reflect the actual dimensional relation. In addition, on figures explained below, the members/parts providing the same effect might be provided with the same numerals and signs, and overlapped explanation might be omitted or simplified. Additionally, in the present specification, when a numerical value range is described as A to B (here, A and B are arbitrary values), the numerical value range is similar to a general interpretation, means a range equal to or more than A and not more than B, and semantically covers a numerical value range being more than A and less than B.

In the present specification, a term "secondary battery" widely means a general electric storage device in which a charge carrier moves between a pair of electrodes (positive electrode and negative electrode) through an electrolyte so as to generate a charge and discharge reaction. The secondary battery described above semantically covers not only a so-called storage battery, but also a capacitor, such as an electric double layer capacitor. Additionally, a term "lithium ion secondary battery" in the present specification means a secondary battery in which a lithium ion is used as a charge carrier and charge and discharge is implemented by movement of electric charges with lithium ions between positive and negative electrodes.

Figure 1:
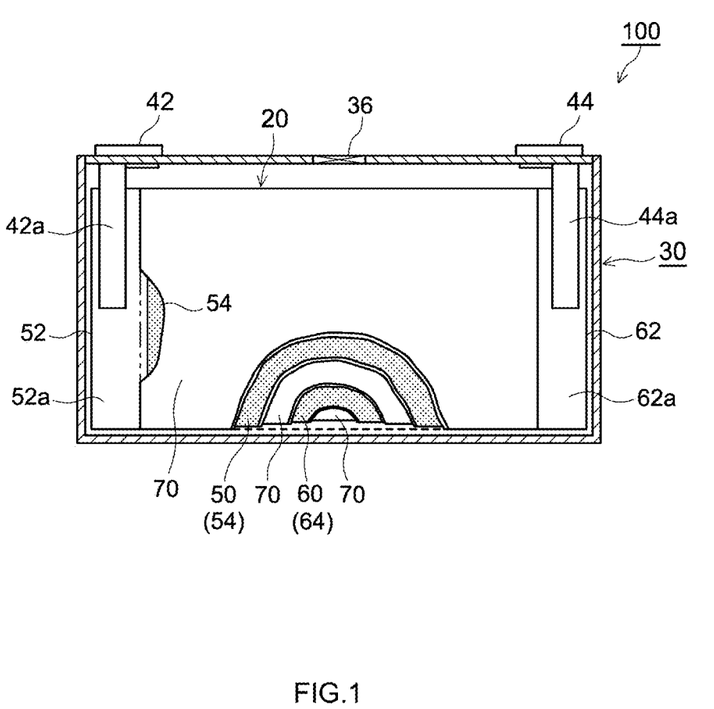
FIG. 1 is a cross section view that schematically shows a configuration of a nonaqueous electrolyte secondary battery in accordance with one embodiment.

Below, one embodiment of a herein disclosed nonaqueous electrolyte secondary battery will be described. FIG. 1 is a cross section view that schematically shows a configuration of the nonaqueous electrolyte secondary battery 100 in accordance with one embodiment. The nonaqueous electrolyte secondary battery 100 herein is a lithium ion secondary battery. The nonaqueous electrolyte secondary battery 100 is a square type sealed battery that is constructed by accommodating a flat-shaped wound electrode assembly 20 and a nonaqueous electrolyte (not shown) inside a battery case 30. The battery case 30 includes a positive electrode terminal 42 and a negative electrode terminal 44 that are configured for outside connection. In addition, a thin-walled safety valve 36 is provided that is set to release an internal pressure of the battery case 30 when the internal pressure rises to reach a level equal to or more than a predetermined level. Furthermore, the battery case 30 is provided with an injection port (not shown) for injecting the nonaqueous electrolyte. It is preferable that a material of the battery case 30 is a metal material which has high strength, lightweight, and good thermal conductivity. As for the metal material described above, it is possible to use, for example, aluminum, steel, or the like.

Figure 2:
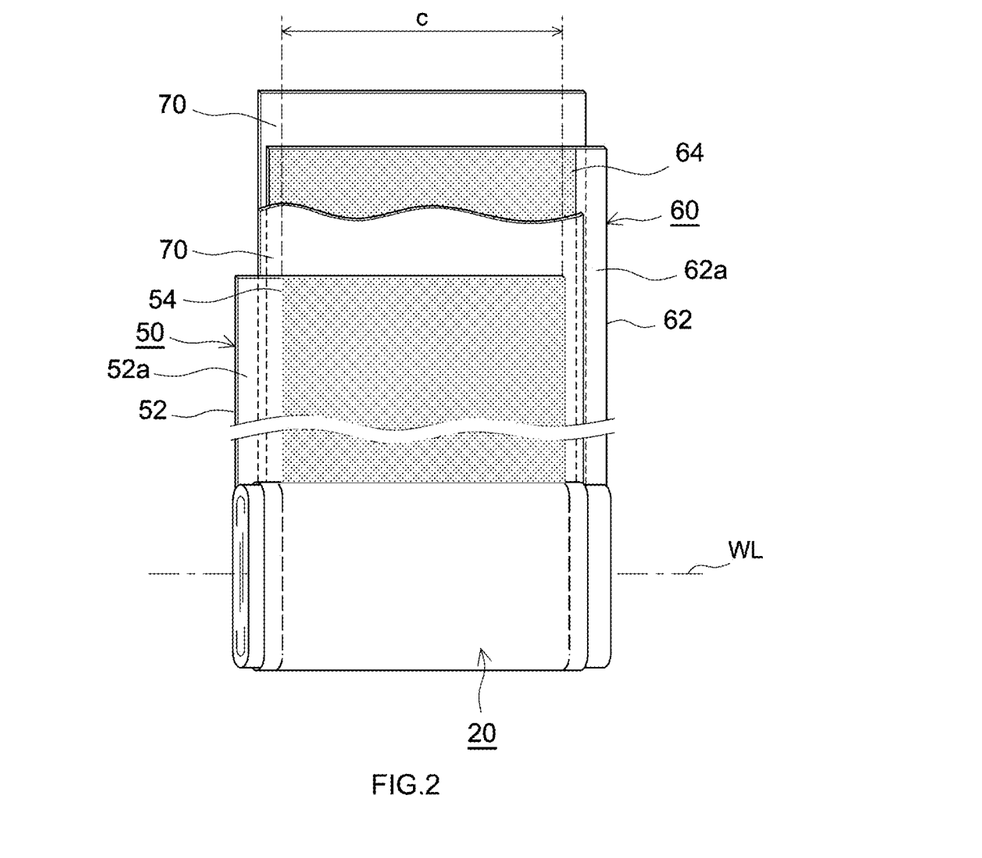
FIG. 2 is an exploded view that schematically shows a configuration of a wound electrode assembly of the nonaqueous electrolyte secondary battery in accordance with one embodiment.

FIG. 2 is an exploded view that schematically shows a configuration of the wound electrode assembly 20 of the nonaqueous electrolyte secondary battery 100 in accordance with one embodiment. As shown in FIG. 2, the wound electrode assembly 20 includes a long sheet-shaped positive electrode 50 and a long sheet-shaped negative electrode 60, which are stacked one on another (laminated) via 2 long sheet-shaped separators 70 and are wound therein in a longitudinal direction with a winding axis WL treated as a center. The positive electrode 50 includes a long sheet-shaped positive current collector 52 and a positive electrode active material layer 54 that is formed along a longitudinal direction of one surface or both surfaces (here, both surfaces) of the positive current collector 52. At one edge part of the positive current collector 52 in the winding axis WL direction (in other words, sheet width direction orthogonal to the longitudinal direction), a portion (in other words, positive current collector exposed part 52a), in which the positive electrode active material layer 54 is not formed and thus the positive current collector 52 is exposed along the edge part in a strip-like shape, is provided. In addition, the negative electrode 60 includes a long sheet-shaped negative current collector 62 and a negative electrode active material layer 64 that is formed along the longitudinal direction of one surface or both surfaces (here, both surfaces) of the negative current collector 62. At the other edge part of the negative current collector 62 in the winding axis WL direction, a portion (in other words, negative current collector exposed part 62a), in which the negative electrode active material layer 64 is not formed and thus the negative current collector 62 is exposed along the edge part in a strip-like shape, is provided. A positive current collector plate 42a is joined to the positive current collector exposed part 52a, and a negative current collector plate 44a is joined to the negative current collector exposed part 62a (see FIG. 1). The positive current collector plate 42a is electrically connected to the positive electrode terminal 42 configured for outside connection, so as to implement conduction between the inside and the outside of the battery case 30. Similarly, the negative current collector plate 44a is electrically connected to the negative electrode terminal 44 configured for outside connection, so as to implement conduction between the inside and the outside of the battery case 30 (see FIG. 1).

As the positive current collector 52 configuring the positive electrode 50, it is possible to use, for example, an aluminum foil. As a positive electrode active substance included by the positive electrode active material layer 54, it is possible to use, for example, lithium composite metal oxide having a layer-shaped structure, spinel structure, or the like, and lithium composite metal oxide is preferably used that is represented by, for example, a composition formula: $Li_\alpha(Ni_xCo_yMn_z)O2$ (however, $1 \leq \alpha \leq 1.2$, $0 \leq x \leq 1$, $0 \leq y \leq 1$, $0 \leq z \leq 1$, and $x+y+z=1$ are satisfied). As the lithium composite metal oxide, it is possible to use, for example, $LiNi_{1/3}Co_{1/3}Mn_{1/3}O_2$, $LiNiO_2$, $LiCoO_2$, or the like.

A content amount of the positive electrode active substance in the positive electrode active material layer 54 (in other words, content amount of the positive electrode active substance with respect to a total mass of the positive electrode active material layer 54), which is not particularly restricted, is preferably equal to or more than 80 mass %, or further preferably equal to or more than 90 mass %. By making the content amount of the positive electrode active substance in the positive electrode active material layer 54 be within the above described range, it is possible to provide a battery whose energy density is high.

In addition, the positive electrode active material layer 54 might contain an electrical conducting material, a binder, or the like. As the electrical conducting material, it is possible to suitably use, for example, a carbon black, such as acetylene black (AB), a carbon nanotube, such as single layer carbon nanotube and multilayer carbon nanotube, or the other carbon materials (graphite, or the like). As the binder, it is possible to use, for example, polyvinylidene fluoride (PVDF), polytetrafluoroethylene (PTFE), or the like.

A basis weight of the positive electrode active material layer 54, which is not particularly restricted, for example, might be equal to or more than 10 mg/cm$^2$ and not more than 15 mg/cm$^2$, or equal to or more than 11 mg/cm$^2$ and not more than 13.3 mg/cm$^2$. In addition, an electrode thickness of the positive electrode 50, which is not particularly restricted, for example, might be equal to or more than 50 μm and not more than 65 μm, or equal to or more than 52 μm and not more than 61 μm.

The positive electrode active material layer 54 can be formed by dispersing the positive electrode active substance and a material used as needed (electrical conducting material, binder, or the like) into a suitable solvent (for example, N-methyl-2-pyrrolidone: NMP), preparing a paste-like (or slurry-like) composition (paste for forming the positive electrode active material layer), coating a surface of the positive current collector 52 with a suitable amount of this composition, and then drying the resultant. At the coating time described above, it is possible to adjust a basis weight, thickness (or thickness of the positive electrode 50), and coating width of the positive electrode active material layer 54.

As the negative current collector 62 configuring the negative electrode 60, it is possible to use, for example, a copper foil, or the like. The negative electrode active material layer 64 contains the herein disclosed negative electrode active substance. As the negative electrode active substance, it is possible without particular restriction to use 1 kind, 2 kinds, or more among various materials that are known to be used for the negative electrode of the nonaqueous electrolyte secondary battery. As one suitable example, it is possible to use a carbon material, such as graphite, hard carbon, and soft carbon. The negative electrode active substance might be amorphous coat graphite in which a surface of a granular natural graphite is coated with amorphous carbon, for example, carbon black.

A content amount of the negative electrode active substance in the negative electrode active material layer 64 (in other words, content amount of the negative electrode active substance with respect to a total mass of the negative electrode active material layer 64), which is not particularly restricted, is preferably equal to or more than 90 mass %, further preferably equal to or more than 95 mass %, or furthermore preferably equal to or more than 98 mass %.

In addition, the negative electrode active material layer 64 might further contain a binder, a thickening agent, or the like. As the binder, it is possible to use, for example, styrene butadiene rubber (SBR), or the like. As the thickening agent, it is possible to use, for example, carboxymethyl cellulose (CMC), or the like.

A basis weight of the negative electrode active material layer 64, which is not particularly restricted, might be, for example, equal to or more than 5 mg/cm$^2$ and not more than 10 mg/cm$^2$, or equal to or more than 7 mg/cm$^2$ and not more than 8.5 mg/cm$^2$. In addition, an electrode thickness of the negative electrode 60, which is not particularly restricted, might be, for example, equal to or more than 60 μm and not more than 90 μm, or equal to or more than 65 μm and not more than 85 μm.

The negative electrode active material layer 64 can be formed, for example, by dispersing the negative electrode active substance and a material used as needed (binder, or the like) into a suitable solvent (for example, ion exchange water), preparing a paste-like (or slurry-like) composition (paste for forming the negative electrode active material layer), coating a surface of the negative current collector 62 with a suitable amount of this composition, and then drying the resultant. At the coating time described above, it is possible to adjust a basis weight, thickness (or thickness of the negative electrode 60), coating width, and the like, of the negative electrode active material layer 64.

As the separator 70, it is possible to use various fine porous sheets similar to ones conventionally used for the nonaqueous electrolyte secondary battery, and possible to use, for example, a fine porous resin sheet consisting of polyethylene (PE), polypropylene (PP), or the like. The fine porous resin sheet described above might have a single-layer structure, or might have a multilayer structure consisting of two or more layers (for example, three-layer structure in which PP layers are laminated on both surfaces of a PE layer). In addition, a heat resistant layer (HRL) might be formed on a surface of the separator 70.

A thickness of the separator 70, which is not particularly restricted, might be, for example, equal to or more than 5 μm and not more than 30 μm, preferably equal to or more than 10 μm and not more than 25 μm, or further preferably equal to or more than 15 μm and not more than 20 μm. If the thickness is within this kind of range, it is possible to enhance the strength of the separator 70 and to implement light weighting of the wound electrode assembly 20.

A length (width) of the separator 70 in a width direction (in other words, direction orthogonal to the longitudinal direction), which is not particularly restricted, is typically set to be longer at least than coating widths of the positive electrode active material layer 54 and negative electrode active material layer 64, in order to secure an insulating property between the positive electrode 50 and the negative electrode 60. The width of the separator 70 might be, for example, equal to or more than 10 mm and not more than 300 mm, equal to or more than 50 mm and not more than 150 mm, or equal to or more than 90 mm and not more than 120 mm.

Regarding the nonaqueous electrolyte, it is possible to use one similar to a nonaqueous electrolyte of a conventional lithium ion secondary battery, and it is possible to use, for example, a nonaqueous electrolyte that a supporting salt is contained in an organic solvent (nonaqueous solvent). As the nonaqueous solvent, it is possible to use an aprotic solvent, such as carbonates, esters, and ethers. Among them, it is possible to suitably use the carbonates, such as ethylene carbonate (EC), diethyl carbonate (DEC), dimethyl carbonate (DMC), and ethyl methyl carbonate (EMC). Alternatively, it is possible to preferably use a fluorine type solvent, such as a fluorinated carbonate, for example, monofluoroethylene carbonate (MFEC), difluoroethylene carbonate (DFEC), monofluoromethyl difluoromethyl carbonate (F-DMC), or trifluoro dimethyl carbonate (TFDMC). Regarding these nonaqueous solvents, it is possible to select and use 1 kind of them, or suitably combine and use 2 kinds or more of them. As the supporting salt, it is possible to suitably use a lithium salt, for example, $LiPF_6$, $LiBF_4$, $LiClO_4$, or the like. It is preferable that a concentration of the supporting salt, which is not particularly restricted, is approximately equal to or more than 0.7 mol/L and not more than 1.3 mol/L.

The nonaqueous electrolyte might contain a component other than the above described nonaqueous solvents and supporting salts, if the effect of the present technique is not significantly spoiled, and might contain various additive agents, for example, a gas generating agent, a coating film forming agent, a dispersing agent, a thickening agent, or the like. In particular, it is possible to use an oxalate complex chemical compound, such as fluoro phosphate (preferably, difluoro phosphate; for example, difluoro phosphoric acid lithium represented by $LiPO_2F_2$), and lithium bis(oxalate) borate (LiBOB).

Figure 3:
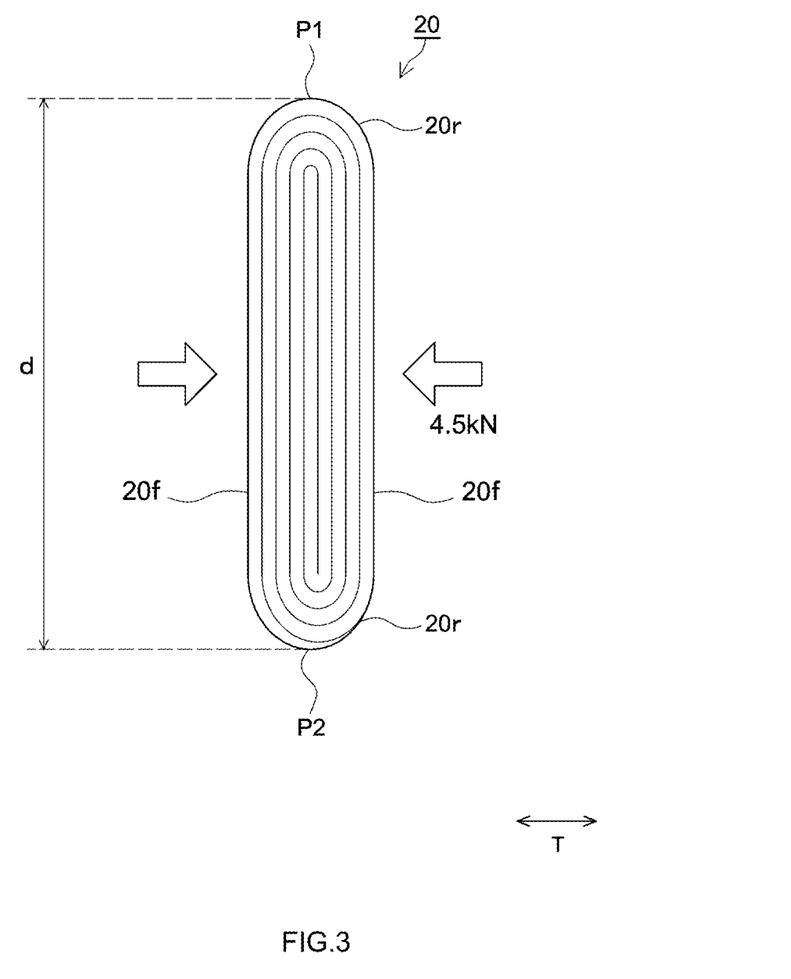
FIG. 3 is a cross section view that schematically shows a cross section orthogonal to a winding axis of the wound electrode assembly when 4.5 kN pressure is added from a thickness direction of the wound electrode assembly.

FIG. 3 is a cross section view that schematically shows a cross section orthogonal to the winding axis WL of the wound electrode assembly 20 when 4.5 kN pressure is added from a thickness direction T of the wound electrode assembly 20. The wound electrode assembly 20 includes a pair of flat surface parts 20f formed to sandwich the winding axis and be opposed mutually. Incidentally, an opposed direction of the pair of flat surface parts 20f can be the thickness direction T of the wound electrode assembly 20. In addition, the wound electrode assembly 20 includes a pair of R parts 20r formed between the pair of flat surface parts 20f. The R part 20r is formed to have the surface of R part become a curved surface. The R part 20r is a portion where liquid retaining of the nonaqueous electrolyte is easily implemented. Thus, as a rate of the R part 20r is increased more in the whole of the wound electrode assembly 20, more nonaqueous electrolytes are retained inside the wound electrode assembly 20. As the result, it becomes difficult to generate an ununiformity of the salinity distribution inside the wound electrode assembly 20 even during the high-rate charge and discharge operation, and thus it is possible to suppress the high-rate degradation.

However, in general, making the height of the wound electrode assembly be lower in order to increase the rate of the R part in the wound electrode assembly would happen to reduce the battery capacity by the lowered height amount. On the other hand, making the length in the width direction (in other words, winding axis direction) of the wound electrode assembly be longer and making the coating width of the positive electrode active material layer be wider in order to compensate for the battery capacity corresponding to the lowered height amount would easily happen to make the salinity be not uniform inside the wound electrode assembly at the high-rate charge and discharge time, so as to generate a contradiction that the high-rate degradation tends to be easily accelerated.

Therefore, the present disclosure provides the wound electrode assembly 20 that can properly suppress the high-rate degradation. The wound electrode assembly 20 can be characterized, under a state where 4.5 kN pressure (restriction pressure) is added from the opposed direction of the pair of flat surface parts 20f of the wound electrode assembly 20 as shown in FIG. 3 onto the whole of the flat surface part 20f so as to restrict, by a total a (mm) of outermost circumferential lengths of the pair of R parts 20r of the wound electrode assembly 20 on a cross section orthogonal to the winding axis WL of the wound electrode assembly 20, an outermost circumferential length b (mm) of the wound electrode assembly 20, a height d (mm) of the wound electrode assembly 20 which is a distance between apexes P1, P2 of the pair of R parts 20r, and a length c (mm) in a width direction orthogonal to the longitudinal direction (in other words, winding axis WL direction) of the positive current collector 52 of the positive electrode active material layer 54. Incidentally, in the present specification, unless otherwise particularly noted, a wording about "restricted state" means a state where 4.5 kN pressure (restriction pressure) is added to the whole of the flat surface part 20f from the opposed direction of the pair of flat surface parts 20f of the wound electrode assembly 20 so as to make the wound electrode assembly 20 be restricted. In addition, the restriction pressure might be within a range of 4.5±0.1 kN, as an error being unavoidable due to a performance, or the like, of a restriction jig which adds the restriction pressure, can be allowed.

A value (a/b), in which the total a (mm) of the outermost circumferential lengths of the pair of R parts 20r of the wound electrode assembly 20 is divided by the outermost circumferential length b (mm) of the wound electrode assembly 20, becomes an indicator that indicates an occupation rate of the R part 20r with respect to the whole of the wound electrode assembly 20. From a perspective of enhancing a liquid retaining property of the wound electrode assembly 20, $0.282 < a/b$ is preferable, $0.287 \le a/b$ is further preferable, or $0.289 \le a/b$ is furthermore preferable. In addition, although not particularly restricted, it is preferable from a perspective of accommodating the wound electrode assembly 20 at a high density inside the square-shaped battery case 30, for example, to satisfy $a/b \le 0.4$, or $a/b \le 0.32$.

The total a (mm) of the outermost circumferential lengths of the pair of R parts 20r of the wound electrode assembly 20 is, which is not particularly restricted, for example, equal to or more than 30 mm and not more than 40 mm, or preferably equal to or more than 33 mm and not more than 37 mm. Incidentally, in the present specification, a total a (mm) of the outermost circumferential lengths of the pair of R parts 20r is calculated as a length of a circumference for which a thickness of the wound electrode assembly 20 under the restricted state is treated as the diameter.

The outermost circumferential length b (mm) of the wound electrode assembly 20 is, which is not particularly restricted, for example, equal to or more than 110 mm and not more than 130 mm, or preferably equal to or more than 115 mm and not more than 120 mm. Incidentally, the outermost circumferential length b (mm) of the wound electrode assembly 20 can be calculated by various calculation methods. For example, it can be calculated as a total of a measurement value of the length of the flat surface part 20f and the total a of the pair of outermost circumferential lengths. In addition, for example, it can be calculated by using a diameter (total of a diameter of the winding core (winding core diameter) and a thickness of the electrode assemblies sandwiching the winding core and being opposed to each other) when winding has been performed on the winding core used as the winding axis WL so as to obtain a length of the circumference.

A value (c/d), in which the length c (mm) of the positive electrode active material layer 54 in a width direction orthogonal to the longitudinal direction of the positive current collector 52 is divided by the height d (mm) of the wound electrode assembly 20 being a distance between the apexes P1, P2 of the pair of R parts 20r, is an indicator that indicates a ratio of the width and height of the wound electrode assembly 20. From a perspective of suppressing the ununiformity of the salinity in the width direction of the wound electrode assembly 20 at the high-rate charge and discharge operation, $c/d<1.91$ is preferable, $c/d\leq1.77$ is further preferable, or $c/d\leq1.72$ is furthermore preferable. In addition, although not particularly restricted, from a perspective of suppressing the ununiformity of the salinity in the height direction of the wound electrode assembly 20 at the high-rate charge and discharge operation, for example, $1.59<c/d$ is satisfied, $1.63\leq c/d$ is preferably, or $1.66\leq c/d$ is further preferable.

The length c (mm) of the positive electrode active material layer 54 in the width direction orthogonal to the longitudinal direction of the positive current collector 52 is, which is not particularly restricted, for example, equal to or more than 60 mm and not more than 120 mm, might be equal to or more than 80 mm and not more than 100 mm, or could be equal to or more than 85 mm and not more than 90 mm.

The length of the negative electrode active material layer 64 in the width direction orthogonal to the longitudinal direction of the negative current collector 62 is, which is not particularly restricted, typically set to be longer than the length of the positive electrode active material layer 54 in the width direction. Thus, the lithium ion emitted from the positive electrode active material layer 54 can be sufficiently accepted by the negative electrode active material layer 64, and therefore it is possible to suppress precipitation of the metal lithium. The length of the negative electrode active material layer 64 in the width direction orthogonal to the longitudinal direction of the negative current collector 62 is, for example, equal to or more than 70 mm and not more than 120 mm, might be equal to or more than 80 mm and not more than 110 mm, or could be equal to or more than 90 mm and not more than 100 mm.

Incidentally, the length c (mm) of the positive electrode active material layer 54 in the width direction orthogonal to the longitudinal direction of the positive current collector 52 can be measured with a commercially available width measuring device. In addition, it is possible that the length of the negative electrode active material layer 64 in the width direction orthogonal to the longitudinal direction of the negative current collector 62 can be also measured, similarly.

The height d (mm) of the wound electrode assembly 20 being the distance between the apexes P1, P2 of the pair of R parts 20r is, which is not particularly restricted, for example, preferably equal to or more than 50 mm and not more than 55 mm, or can be equal to or more than 52 mm and not more than 54 mm. With the height as described above, the rate of the R part 20r of the wound electrode assembly 20 is suitably adjusted, and thus it is possible to more suitably suppress the high-rate degradation. Incidentally, regarding the height d (mm) of the wound electrode assembly 20, it is possible to, for example, take out the wound electrode assembly 20 from the battery case, keep the state where 4.5 kN pressure is added from the thickness direction T (opposed direction of the pair of flat surface parts 200 of the wound electrode assembly 20 so as to restrict, and then measure the height at the central part in the width direction of the wound electrode assembly 20 with a commercially available laser displacement gauge.

The thickness of the wound electrode assembly 20 under the restricted state is, which is not particularly restricted, for example, equal to or more than 10 mm and not more than 12 mm, or can be equal to or more than 10.6 mm and not more than 11.7 mm. The thickness of the wound electrode assembly 20 can be, for example, measured with a commercially available laser displacement gauge.

A lamination number of the positive electrode 50 of the wound electrode assembly 20 is, which is not particularly restricted, for example, 30 to 40 or might be 31 to 35.

In one suitable aspect of the herein disclosed nonaqueous electrolyte secondary battery 100, regarding the above described a, b, c, and d, it is preferable to satisfy all conditions: $0.282<a/b$ and $c/d<1.91$. By satisfying these conditions, it becomes difficult to cause the ununiformity of the salinity inside the wound electrode assembly 20 even when the high-rate charge and discharge operation has been performed, and thus the high-rate degradation is suitably suppressed.

Figure 4:
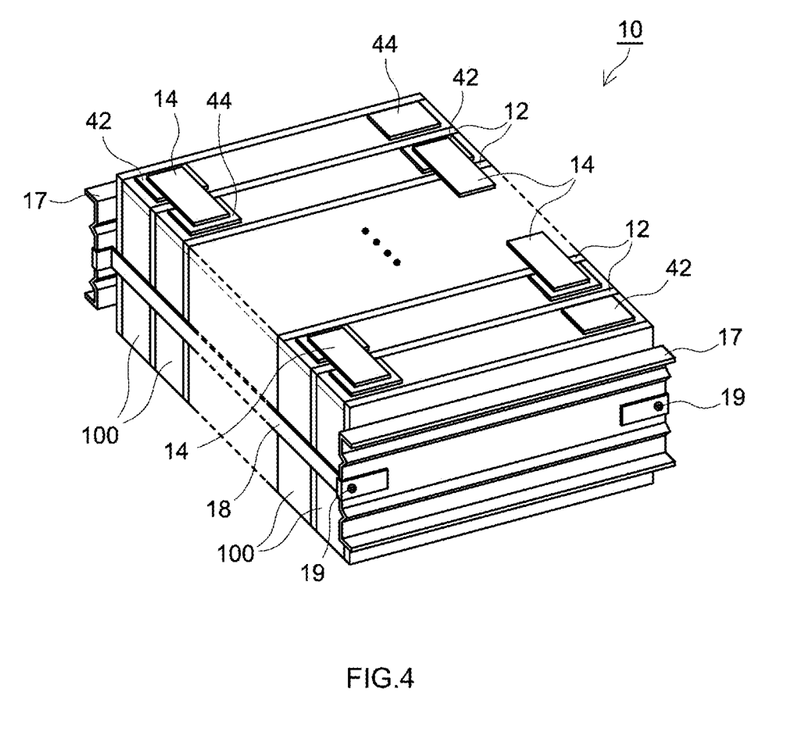
FIG. 4 is a perspective view that schematically shows a configuration of a battery pack in accordance with one embodiment.

The herein disclosed nonaqueous electrolyte secondary battery 100 can be used preferably as a single-battery included by the battery pack 10. FIG. 4 is a perspective view that schematically shows a configuration of the battery pack 10 in accordance with one embodiment. As shown in FIG. 4, here, the nonaqueous electrolyte secondary battery 100 is used as for plural single-batteries configuring the battery pack 10, and plural nonaqueous electrolyte secondary batteries are electrically and mutually connected to be arranged. By arranging the nonaqueous electrolyte secondary batteries 100 in a sequence while nonaqueous electrolyte secondary batteries are reversed mutually one by one, the positive electrode terminals 42 and the negative electrode terminals 44 are alternately arranged in the arrangement direction. Between the arranged nonaqueous electrolyte secondary batteries 100, a spacer 12 is sandwiched. The spacer 12 can function as a heat radiation means for efficiently dissipating heat, a length adjusting means, or the like. At both ends of the arranged nonaqueous electrolyte secondary batteries 100, a pair of end plates (restriction plates) 17 are disposed. Additionally, to cross-link the both end plates 17, a beam material 18 for fastening is attached. An end part of the beam material 18 is fastened and fixed by a screw 19 on the end plate 17. Thus, plural nonaqueous electrolyte secondary batteries 100 are restricted to make a predetermined restriction load be added in the arrangement direction (thickness direction of the wound electrode assembly 20) of the nonaqueous electrolyte secondary battery 100.

The battery pack 10 includes a bus bar 14 that is configured, between 2 nonaqueous electrolyte secondary batteries 100 arranged adjacently, to connect the positive electrode terminal 42 of one single-battery (nonaqueous electrolyte secondary battery 100) and the negative electrode terminal 44 of another single-battery (nonaqueous electrolyte secondary battery 100). Thus, plural nonaqueous electrolyte secondary batteries 100 are electrically connected to each other. Here, plural nonaqueous electrolyte secondary batteries 100 are connected in series, but might be connected in parallel. In addition, it is sufficient regarding the single-batteries configuring the battery pack 10 that at least 1 of the herein disclosed nonaqueous electrolyte secondary batteries 100 is contained, or all single-batteries might be configured with the herein disclosed nonaqueous electrolyte secondary batteries 100.

Above, the nonaqueous electrolyte secondary battery 100 and the battery pack 10 in accordance with one embodiment have been explained. The nonaqueous electrolyte secondary battery 100 and the battery pack 10 can be used for various purposes. As a particular purpose, it is possible to select a power supply for driving automobiles, such as electric vehicle (battery electric vehicle), hybrid vehicle (hybrid electric vehicle), and plug-in hybrid vehicle (plug-in hybrid electric vehicle); a storage battery, such as small electric power storage apparatus, or the like, and the power supply for driving automobiles is preferable among them.

Additionally, in another embodiment, the nonaqueous electrolyte secondary battery 100 might include an exterior film for securing an insulating property between the wound electrode assembly 20 and the battery case 30. The exterior film is configured with a material capable of functioning as an insulating member, and it is possible to use, for example, various thermoplastic resins, or polyolefin resin materials, typically, polypropylene (PP), polyethylene (PE), or the like. A shape of the exterior film can be, which is not particularly restricted, for example, a bottomed bag shape whose top end part is opened. When the exterior film is formed in the bag shape as described above, it is possible to accommodate the wound electrode assembly 20, from the opening part of the exterior film, inside the exterior film so as to use the resultant.

Below, a practical example related to the herein disclosed technique will be explained, which is not intended to restrict the herein disclosed technique within this practical example.

Electrode assemblies of Examples 1 to 17 were prepared and then, for each electrode assembly, the structure and the high-rate resistance increasing ratio were compared.

<Manufacture of Positive Electrode>

A lithium-nickel-cobalt-manganese composite oxide ($LiNi_{1/3}Co_{1/3}Mn_{1/3}O_2$) as the positive electrode active substance, a multilayer carbon nanotube as the electrical conducting material, and polyvinylidene fluoride (PVdF) as the binder were mixed to satisfy a weight ratio being (positive electrode active substance):(electrical conducting material):(binder)=91:6:3, and a proper amount of N-methyl-2-pyrrolidone (NMP) was added as the solvent, so that the slurry for forming the positive electrode active material layer was prepared. This slurry for forming the positive electrode active material layer was used for coating to have a predetermined width so as to implement a predetermined basis weight on the positive current collector made of an aluminum foil. Then, drying and roll pressing were performed so as to manufacture the positive electrode. Incidentally, the positive electrode active material layer was formed on both surfaces of the positive current collector. A basis weight, an electrode thickness, a coating width, and an electrode length of the positive electrode on Examples 1 to 17 are shown in Table 1.

<Manufacture of Negative Electrode>

An amorphous coat natural graphite as the negative electrode active substance, a styrene butadiene rubber (SBR) as the binder, and carboxymethyl cellulose (CMC) as the thickening agent were mixed to satisfy a weight ratio being (negative electrode active substance):(binder):(thickening agent)=98:1:1, and a proper amount of ion exchange water was added as the solvent, so that the slurry for forming the negative electrode active material layer was prepared. This slurry for forming the negative electrode active material layer was used for coating to have a predetermined width so as to implement a predetermined basis weight on the negative current collector made of a copper foil. Then, drying and roll pressing were performed so as to manufacture the negative electrode. Incidentally, the negative electrode active material layer was formed on both surfaces of the negative current collector. A basis weight of the negative electrode, an electrode thickness, a coating width, and an electrode length on Examples 1 to 17 are shown in Table 1. Incidentally, regarding any of Examples 1 to 17, the positive electrode and the negative electrode were manufactured to make the cell capacity be 4.1 Ah.

As the separator, a fine porous polyolefin sheet including a three-layer structure of PP/PE/PP was prepared. A thickness, a width, and a length of the separator on Examples 1 to 17 are shown in Table 1.

<Manufacture of Wound Electrode Assembly>

For each example, the separator, the negative electrode, another separator, and then the positive electrode were superimposed in this order from the bottom, so as to prepare a laminated body. This laminated body was wound in the longitudinal direction about a winding core having a predetermined diameter (see Table 1), which is treated as a center. This laminated body having been wound was compressed for 3 seconds at 6.9 kN from a laminated direction, compressed for 1 second at 2 kN, and then further compressed at 1 mm/minute speed. Then, the compression was continued until the restriction load reached 4 kN, so as to manufacture the wound electrode assembly that was formed in a flat shape. The thickness (in other words, distance between flat surface parts) of the wound electrode assembly at that time was measured with a laser displacement gauge (made by KEYENCE corporation, product name: LK-G157).

Next, after the electrical collector plate having been connected to a lid body was welded on the wound electrode assembly, the resultant wound electrode assembly was accommodated in a case main body under a state of being accommodated in the exterior film configured with PP. Then, a boundary part between the lid body and the case main body was welded to assembly a test cell, and the nonaqueous electrolyte was injected from a liquid injection hole of the test cell. Incidentally, for the nonaqueous electrolyte, a mix solvent containing ethylene carbonate (EC), ethyl methyl carbonate (EMC), and dimethyl carbonate (DMC) with a volume ratio of EC:EMC:DMC=30:35:35 was used in which LiPF6 was dissolved as the supporting salt at 1.1 mol/L concentration. Then, the liquid injection hole was sealed so as to obtain the test cell formed in a square shape.

<Measurement of Wound Electrode Assembly Thickness at Restriction Time>

The test cell was sandwiched and held by the pair of restriction jigs configured with SUS303. At that time, it was configured to make the restriction jigs sandwich and hold the test cell from the thickness direction of the wound electrode assembly. Next, the test cell having been sandwiched and held by the restriction jigs was set on an autograph (made by SHIMADZU corporation, product name: AG-IS (50 kN)). The autograph was used to add 4.5 kN pressure so as to pressurize in the thickness direction of the electrode assembly, and a laser displacement gauge (made by KEYENCE corporation, product name: LK-G157) was used to measure the thickness of the cell after 60 seconds under the pressurized condition (sum of the thickness of the electrode assembly under the pressurized condition, the thickness of the side wall of the battery case, and the thickness of the exterior film). Then, the thickness of the electrode assembly under the pressure of 4.5 kN (wound electrode assembly thickness under the restriction) was calculated by subtracting the thickness of the wall of the battery case and the thickness of the exterior film, from the thickness of the cell. Incidentally, it was presumed that the thickness of the side wall of the battery case and the thickness of the insulating film were not changed under the pressure of 4.5 kN.

<Measurement of High-Rate Resistance Increasing Ratio>

An initial resistance was calculated, with the test cell having been kept under 25° C. environment, by adjusting to make SOC (state of charge) be 60% and by using a voltage drop quantity ΔV and a current value I at that time when an electric discharge operation was performed with current 30

C for 10 seconds. After that, the test cell was adjusted under 25° C. environment to make the SOC be 60%, again. Then, while a sum of pulse charge 30 C for 10 seconds, pause for 10 seconds, pulse electric discharge 30 C for 30 seconds, and pause for 10 seconds was treated as 1 cycle, 2000 cycles of the pulse charge and discharge operations were performed. Then, the voltage drop quantity and current value at pulse electrically discharging time on the 2000th cycle were used to calculate the resistance value after the 2000th cycle. A ratio of the initial resistance and the resistance value after the 2000th cycle was used to calculate the resistance increasing rate (high-rate resistance increasing ratio) after the high-rate charge and discharge operation. Results are shown in Table 1. Incidentally, a wording "1 C" means a current volume which makes the SOC be 100% from 0% for 1 hour.

<Measurement of Wound Electrode Assembly Height (d) at Restriction Time>

After the high-rate resistance increasing ratio was measured, the wound electrode assembly was taken out from the test cell, and the above described autograph was used to pressurize at 4.5 kN from the thickness direction of the wound electrode assembly for 60 seconds. Then, a width measuring sensor (made by KEYENCE corporation, product name: LK-G157) was used to measure the height of the wound electrode assembly under the pressurized state after 60 seconds. Incidentally, the distance between apexes of the R parts of the central parts in the width direction of the wound electrode assembly was treated as the height of the wound electrode assembly. Results are shown in Table 1.

<Calculation of Outermost Circumferential Length (a) of Wound Electrode Assembly at Restriction Time>

On the cross section orthogonal to the winding axis of the wound electrode assembly, the outermost circumferential length of the pair of R parts with 4.5 kN pressure having been added in the thickness direction of the wound electrode assembly was presumed to be the same as a circumference of a circle whose diameter was the thickness of the wound electrode assembly at the restriction time, and the length of the outermost circumferential of the R part of the wound electrode assembly at the restriction time was calculated by the following formula.

$$\text{(wound electrode assembly thickness at the restriction time)} \times \pi \quad \text{Formula}$$

Results are shown in Table 1.

<Calculation of Outermost Circumferential Length (b) of Wound Electrode Assembly at Restriction Time>

The outermost circumferential length (b) of the wound electrode assembly at the restriction time on the cross section orthogonal to the winding axis of the wound electrode assembly was calculated by the following formula.

$$(\text{"winding core diameter"} + \text{"thickness of the wound electrode assembly at the wound electrode assembly manufacturing time"}) \times \pi \quad \text{Formula}$$

Results are shown in Table 1.

Figure 5:
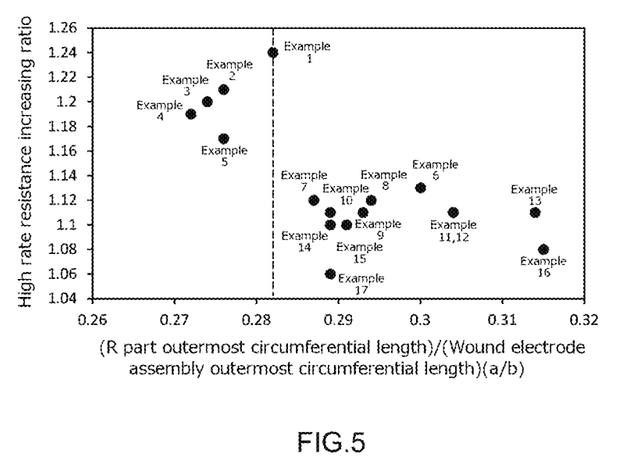
FIG. 5 is a graph of a relation between a value of (R part outermost circumferential length at a restriction time)/(wound electrode assembly outermost circumferential length at the restriction time) and a high-rate resistance increasing ratio.
Figure 6:
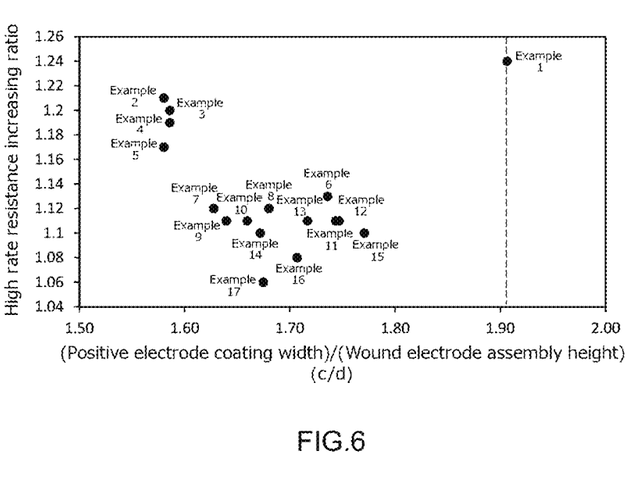
FIG. 6 is a graph of a relation between (positive electrode coating width)/(wound electrode assembly height at the restriction time) (c/d) and a high-rate resistance increasing ratio.

The value (a/b) of (R part outermost circumferential length at a restriction time)/(wound electrode assembly outermost circumferential length at the restriction time) and the value (c/d) of (positive electrode coating width)/(wound electrode assembly height at the restriction time) were calculated. Results are shown in Table 1. In addition, a graph of a relation for the value of (R part outermost circumferential length at the restriction time)/(wound electrode assembly outermost circumferential length at the restriction time) and the high-rate resistance increasing ratio is shown in FIG. 5. In addition, a graph of a relation for the value (c/d) of (positive electrode coating width)/(wound electrode assembly height at the restriction time) and the high-rate resistance increasing ratio is shown in FIG. 6.

TABLE 1

| | Positive electrode | | | | Negative electrode | | | | Separator | | | Winding |
|---|---|---|---|---|---|---|---|---|---|---|---|---|
| | Basis weight [mg/cm$^2$] | Electrode thickness [μm] | Coating width (c) [mm] | Electrode length [mm] | Basis weight [mg/cm$^2$] | Electrode thickness [μm] | Coating width [mm] | Electrode length [mm] | Thickness [μm] | Width [mm] | Length [mm] | core diameter [mm] |
| Example 1 | 9.4 | 52 | 105.8 | 3539 | 6 | 66 | 109.8 | 3640 | 16 | 115 | 6966 | 26.8 |
| Example 2 | 10.9 | 60 | 89.6 | 3605 | 6.9 | 67 | 93 | 3714 | 18 | 97.2 | 7210 | 29.2 |
| Example 3 | 10.9 | 60 | 89.6 | 3605 | 6.9 | 65 | 93 | 3714 | 18 | 97.2 | 7210 | 29.2 |
| Example 4 | 10.9 | 57 | 89.6 | 3605 | 6.9 | 67 | 93 | 3714 | 18 | 97.2 | 7210 | 29.2 |
| Example 5 | 10.9 | 60 | 89.6 | 3605 | 6.9 | 67 | 93 | 3714 | 18 | 97.2 | 7210 | 29.2 |
| Example 6 | 13.3 | 57.5 | 88.7 | 2980 | 8.4 | 77.7 | 93 | 3274 | 18 | 97.2 | 6355 | 26.8 |
| Example 7 | 11 | 51.7 | 88.7 | 3600 | 7 | 67.1 | 93 | 3720 | 18 | 97.2 | 7221 | 27.3 |
| Example 8 | 13.3 | 60.5 | 88.7 | 2980 | 8.4 | 80.4 | 93 | 3100 | 18 | 97.2 | 6017 | 26.8 |
| Example 9 | 11.8 | 54.7 | 88.7 | 3363 | 7.5 | 71.6 | 93 | 3483 | 18 | 97.2 | 6761 | 26.8 |
| Example 10 | 12.1 | 60.5 | 89.6 | 3246 | 7.7 | 71.5 | 93 | 3344 | 18 | 97.2 | 6966 | 26.7 |
| Example 11 | 12.1 | 55.6 | 89.6 | 3245 | 7.7 | 71.4 | 93 | 3343 | 18 | 97.2 | 6964 | 25.7 |
| Example 12 | 12.1 | 56.1 | 89.6 | 3245 | 7.7 | 77.4 | 93 | 3343 | 18 | 97.2 | 6964 | 25.7 |
| Example 13 | 12.1 | 58.6 | 89.6 | 3245 | 7.7 | 74.1 | 93 | 3343 | 18 | 97.2 | 6964 | 25.7 |
| Example 14 | 11.5 | 59 | 89.6 | 3425 | 7.3 | 68 | 93 | 3529 | 18 | 97.2 | 7351 | 26.7 |
| Example 15 | 12.1 | 53 | 89.6 | 3245 | 7.7 | 69.6 | 93 | 3343 | 18 | 97.2 | 6964 | 25.7 |
| Example 16 | 12.1 | 52.7 | 89.6 | 3245 | 7.7 | 77.4 | 93 | 3343 | 18 | 97.2 | 6964 | 25.7 |
| Example 17 | 12.1 | 60.5 | 89.6 | 3246 | 7.7 | 71.5 | 93 | 3344 | 18 | 97.2 | 6966 | 26.7 |

| Electrode assembly size under cell restriction | | | | |
|---|---|---|---|---|
| R parts outermost circumferential | Wound electrode assembly outermost circumferential | (R parts outermost circumferential length)/(Wound electrode assembly outermost | (Positive electrode coating width)/(Wound electrode | High-rate |

TABLE 1-continued

| | Thickness (d) [mm] | Height (d) [mm] | length (a) [mm] | length (b) [mm] | circumferential length) (a/b) | assembly height) (c/d) | resistance increasing ratio |
|---|---|---|---|---|---|---|---|
| Example 1 | 10.8 | 55.5 | 33.8 | 119.9 | 0.282 | 1.91 | 1.24 |
| Example 2 | 11.1 | 56.7 | 34.9 | 126.6 | 0.276 | 1.58 | 1.21 |
| Example 3 | 11 | 56.5 | 34.5 | 126.2 | 0.274 | 1.59 | 1.2 |
| Example 4 | 10.9 | 56.5 | 34.3 | 126 | 0.272 | 1.59 | 1.19 |
| Example 5 | 11.1 | 56.7 | 34.9 | 126.6 | 0.276 | 1.58 | 1.17 |
| Example 6 | 11.2 | 51.1 | 35.1 | 116.9 | 0.3 | 1.74 | 1.13 |
| Example 7 | 11 | 54.5 | 34.4 | 119.9 | 0.287 | 1.63 | 1.12 |
| Example 8 | 11 | 52.8 | 34.7 | 117.8 | 0.294 | 1.68 | 1.12 |
| Example 9 | 11 | 54.1 | 34.7 | 118.8 | 0.293 | 1.64 | 1.11 |
| Example 10 | 10.9 | 54 | 34.3 | 118.7 | 0.289 | 1.66 | 1.11 |
| Example 11 | 11.2 | 51.4 | 35.1 | 115.7 | 0.304 | 1.74 | 1.11 |
| Example 12 | 11.3 | 51.3 | 35.6 | 117.1 | 0.304 | 1.75 | 1.11 |
| Example 13 | 11.7 | 52.2 | 36.8 | 116.9 | 0.314 | 1.72 | 1.11 |
| Example 14 | 10.9 | 53.6 | 34.3 | 118.7 | 0.289 | 1.67 | 1.1 |
| Example 15 | 10.6 | 50.6 | 33.3 | 114.7 | 0.291 | 1.77 | 1.1 |
| Example 16 | 11.7 | 52.5 | 36.6 | 116.4 | 0.315 | 1.71 | 1.08 |
| Example 17 | 10.9 | 53.5 | 34.2 | 118.1 | 0.289 | 1.67 | 1.06 |

As shown in Table 1 and FIGS. 5 and 6, Examples 6 to 17 satisfying both 0.282<a/b and c/d<1.91 were able to suppress the high-rate resistance increasing ratio, in comparison with Examples 1 to 5. From this result, it is thought that, by satisfying c/d<1.91, the ununiformity of the salinity in the width direction of the wound electrode assembly can be suppressed. Furthermore, it is thought that, by satisfying 0.282<a/b, the rate of the R part with respect to the whole of the wound electrode assembly became larger, thus the liquid retaining property for the electrolyte inside the wound electrode assembly was enhanced, the ununiformity of the salinity of the wound electrode assembly was further suppressed, and therefore the high-rate degradation was suppressed. Additionally, as shown in FIG. 6, it can be understood that there is a tendency, by further satisfying 1.66≤c/d≤1.72, to furthermore suppress the high-rate resistance increasing ratio.

Above, regarding the herein disclosed technique, a specific example has been explained in detail, which is merely illustrative, and is not construed as limiting the scope of the appended claims. The herein disclosed technique includes ones in which the above described specific example is deformed or changed.

What is claimed is:

1. A nonaqueous electrolyte secondary battery, comprising:
    a nonaqueous electrolyte;
    a flat-shaped wound electrode assembly in which, a sheet-shaped positive electrode which comprises a positive electrode active material layer being formed in a strip-like shape along a longitudinal direction on a long positive current collector, a sheet-shaped negative electrode which comprises a negative electrode active material layer being formed in a strip-like shape along the longitudinal direction on a long negative current collector, and a separator which is disposed between the positive electrode and the negative electrode are stacked one on another and wound in the longitudinal direction; and
    a square-shaped battery case accommodating the nonaqueous electrolyte and the wound electrode assembly, wherein
    the wound electrode assembly comprises: a pair of flat surface parts that are located to be opposed while sandwiching a winding axis; and a pair of R parts whose surfaces located between the pair of flat surface parts are curved surfaces, and
    in a state where 4.5 kN restriction pressure is added to restrict from an opposed direction of the flat surface parts onto a whole of the flat surface parts of the wound electrode assembly,
        when a total of an outermost circumferential length of the pair of R parts of the wound electrode assembly on a cross section orthogonal to the winding axis of the wound electrode assembly is treated as a (mm),
        an outermost circumferential length of the wound electrode assembly on the cross section is treated as b (mm),
        a length in a width direction orthogonal to the longitudinal direction of the positive electrode active material layer is treated as c (mm), and
        a height of the wound electrode assembly being a distance between apexes of the pair of R parts on the cross section is treated as d (mm),
    both of conditions: 0.282<a/b; and c/d<1.91, are satisfied.

2. The nonaqueous electrolyte secondary battery according to claim 1, wherein
    a condition: 1.66≤c/d≤1.72, is further satisfied.

3. The nonaqueous electrolyte secondary battery according to claim 1, wherein
    the height d of the wound electrode assembly is equal to or more than 50 mm and not more than 55 mm.

4. A battery pack, in which plural batteries are electrically and mutually connected so as to be arranged, wherein
    at least one of the batteries is the nonaqueous electrolyte secondary battery according to claim 1.

* * * * *